(12) United States Patent
Raabe et al.

(10) Patent No.: US 10,139,041 B2
(45) Date of Patent: Nov. 27, 2018

(54) TELESCOPIC ARM WITH A PUSH-PULL CHAIN DRIVE

(71) Applicant: Paul Vahle GmbH & Co. KG, Kamen (DE)

(72) Inventors: Michael Raabe, Werne (DE); Werner Vahle, Plombieres (BE); Thomas Muller, Kamen (DE); Steffen Woyczechowski, Dortmund (DE); Michael Heitmann, Unna (DE); Micro Husarek, Bergkamen (DE)

(73) Assignee: Paul Vahle GmbH & Co. KG, Kamen (DE)

( * ) Notice: Subject to any disclaimer, the term of this patent is extended or adjusted under 35 U.S.C. 154(b) by 184 days.

(21) Appl. No.: 14/895,462

(22) PCT Filed: Mar. 17, 2015

(86) PCT No.: PCT/EP2015/055569
§ 371 (c)(1),
(2) Date: Dec. 2, 2015

(87) PCT Pub. No.: WO2015/140173
PCT Pub. Date: Sep. 24, 2015

(65) Prior Publication Data
US 2016/0123521 A1 May 5, 2016

(30) Foreign Application Priority Data

Mar. 19, 2014 (DE) .................. 10 2014 103 741
Apr. 11, 2014 (DE) .................. 10 2014 105 228
Apr. 17, 2014 (DE) .................. 20 2014 101 842

(51) Int. Cl.
*B60L 5/38* (2006.01)
*F16M 11/20* (2006.01)
(Continued)

(52) U.S. Cl.
CPC ............ *F16M 11/2092* (2013.01); *B60L 5/38* (2013.01); *B66C 13/12* (2013.01); *F16G 13/16* (2013.01);
(Continued)

(58) Field of Classification Search
CPC ........... F16M 11/2092; F16M 11/2085; F16M 11/425; F16M 13/027; B60L 5/38; B66C 13/12; F16G 13/16; F16G 13/20
See application file for complete search history.

(56) References Cited

U.S. PATENT DOCUMENTS 4,922,173 A * 5/1990 Lawler .................... B25J 9/023
318/568.2
5,324,163 A * 6/1994 Costa ...................... B25J 9/023
414/751.1
(Continued)

FOREIGN PATENT DOCUMENTS

AT 505757 B1 4/2009
CH 681909 A5 6/1993
(Continued)

OTHER PUBLICATIONS

International Preliminary Report on Patentability (with English translation) and Written Opinion dated Sep. 20, 2016.
(Continued)

*Primary Examiner* — Jason C Smith
(74) *Attorney, Agent, or Firm* — Panitch Schwarze Belisario & Nadel LLP

(57) ABSTRACT

The invention relates to a telescopic arm (1), in particular, for a current collector system for a vehicle which can be driven along a power rail arrangement, wherein the telescopic arm (1) can be extended and/or retracted by means of an adjustment drive (7, 8, 9, 10) and the telescopic arm (1) has a base unit (2) which can be attached to the vehicle, on
(Continued)

Figure 1:
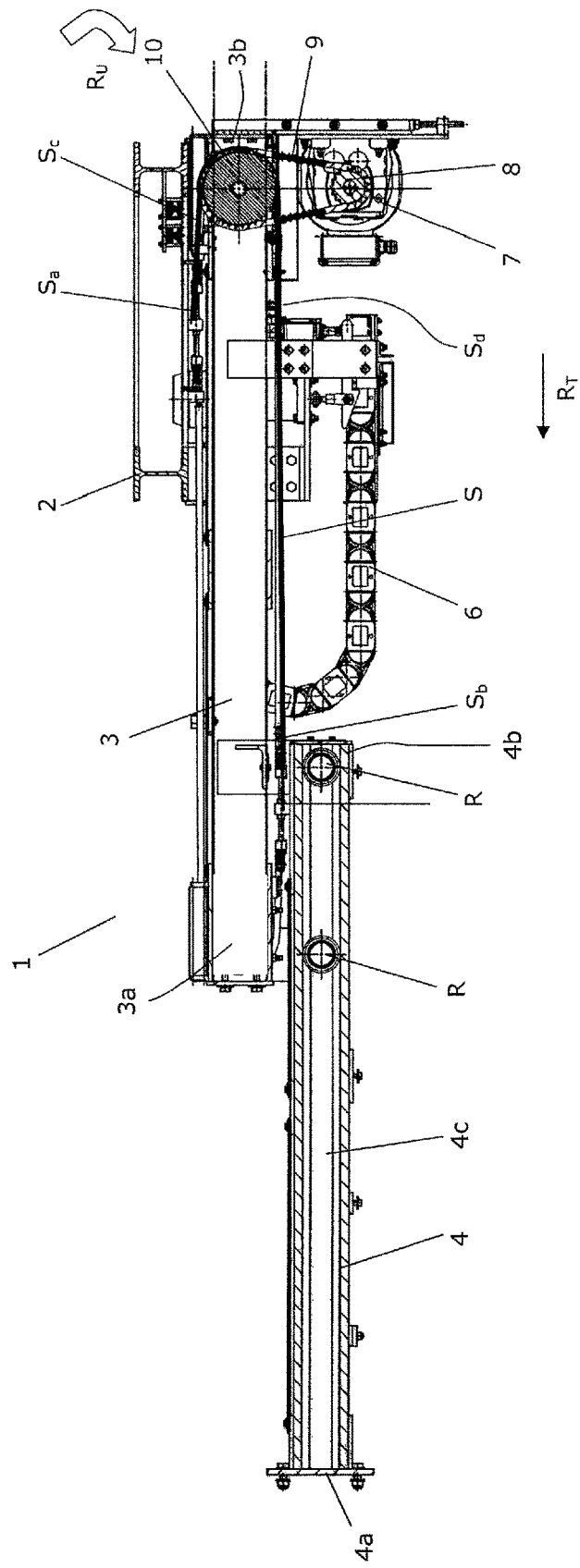

which a first telescopic stage (3) is arranged displaceably in a direction ($R_T$), in particular, horizontally, and a second telescopic stage (4) is arranged displaceably on the first telescopic stage (3) in the same direction ($R_T$), wherein the adjustment drive (7, 8, 9, 10) is arranged on the first telescopic stage (3), characterized in that the adjustment drive (7, 8, 9, 10) interacts with a rigid chain (S), which is connected with its one end ($S_a$) to the base unit (2) and with its other end ($S_b$) to the second telescopic stage (4).

9 Claims, 4 Drawing Sheets

(51) Int. Cl.
| | |
|---|---|
| *B66C 13/12* | (2006.01) |
| *F16G 13/20* | (2006.01) |
| *F16M 11/42* | (2006.01) |
| *F16M 13/02* | (2006.01) |
| *F16G 13/16* | (2006.01) |
| *H02G 11/00* | (2006.01) |

(52) U.S. Cl.
CPC ......... *F16G 13/20* (2013.01); *F16M 11/2085* (2013.01); *F16M 11/425* (2013.01); *F16M 13/027* (2013.01); *H02G 11/00* (2013.01)

(56) References Cited

U.S. PATENT DOCUMENTS

| | | | | |
|---|---|---|---|---|
| 5,476,358 A * | 12/1995 | Costa | ..................... | B25J 9/023 414/749.1 |
| 5,934,141 A * | 8/1999 | Costa | ..................... | B25J 9/023 475/286 |
| 6,151,981 A * | 11/2000 | Costa | ..................... | B25J 9/023 74/490.03 |
| 7,344,017 B1 * | 3/2008 | Taguchi | ................. | B23Q 1/626 198/468.01 |
| 8,844,398 B2 * | 9/2014 | Richardson | .............. | B25J 9/023 74/490.01 |
| 2011/0220447 A1 * | 9/2011 | Schroder | ................... | B60L 5/38 191/50 |
| 2016/0123521 A1 * | 5/2016 | Raabe | ................ | F16M 11/2085 191/45 R |
| 2017/0001524 A1 * | 1/2017 | Vahle | ....................... | B60L 5/38 |

| | | | |
|---|---|---|---|
| 2017/0217333 A1 | 8/2017 | Maier | |
| 2017/0326988 A1 | 11/2017 | Maier et al. | |
| 2017/0349049 A1 | 12/2017 | Lang et al. | |

FOREIGN PATENT DOCUMENTS

| | | | | |
|---|---|---|---|---|
| CN | 101993005 A | | 3/2011 | |
| CN | 201864480 U | | 6/2011 | |
| DE | 3245601 A1 | | 6/1984 | |
| DE | 3315779 A1 | | 11/1984 | |
| DE | 3315779 A1 | * | 11/1984 | ............... B66F 3/06 |
| DE | 9110687 U1 | | 10/1991 | |
| DE | 19613700 A1 | | 10/1997 | |
| DE | 29806487 U1 | | 7/1998 | |
| DE | 102011001712 A1 | | 10/2012 | |
| EP | 1842823 A1 | | 10/2007 | |
| EP | 2616379 B1 | | 6/2014 | |
| WO | 2006130189 A2 | | 12/2006 | |
| WO | 2010054852 A2 | | 5/2010 | |
| WO | 2010070915 A1 | | 6/2010 | |
| WO | 2012130630 A1 | | 10/2012 | |
| WO | 2012130630 A9 | | 5/2013 | |
| WO | 2015130879 A1 | | 9/2015 | |
| WO | 2015154896 A1 | | 10/2015 | |

OTHER PUBLICATIONS

International Search Report (with English translation) and Written Opinion dated May 15, 2015 in International Application No. PCT/EP2015/052421.

Search Report dated Nov. 27, 2014 in DE Application No. 102014103741.3.

Czichos, "Die Grundlagen der Ingenieurwissenschaften", Hütte, 8 pages (1996).

Matek, et al., "Maschinenelemente", vol. 16, 4 pages (1987).

Int'l Search Report and Written Opinion dated Oct. 15, 2015 in Int'l Application No. PCT/EP2015/052422.

International Preliminary Report on Patentability dated Sep. 20, 2016 in International Application No. PCT/EP2015/052421.

International Search Report (with English translation) and Written Opinion dated May 15, 2015 in International Application No. PCT/EP2015/055569.

Search Report dated Nov. 25, 2014 in DE Application No. 202014101842.5.

Int'l Preliminary Report on Patentability (English translation) dated Oct. 12, 2016 in Int'l Application No. PCT/EP2015/052422.

Written Opinion (English Translation) dated May 19, 2015 in Int'l Application No. PCT/EP2015/052422.

* cited by examiner

TELESCOPIC ARM WITH A PUSH-PULL CHAIN DRIVE

CROSS REFERENCE TO RELATED APPLICATIONS

This application is a Section 371 U.S. National Stage Filing of International Application No. PCT/EP2015/055569, filed Mar. 17, 2015, which was published in the German language on Sep. 24, 2015, under International Publication No. WO 2015/140173 A1, which claims priority to German Patent Application No. 10 2014 103 741.3, filed on Mar. 19, 2014, No. 10 2014 105 228.5, filed on Apr. 11, 2014 and No. 20 2014 101 842.5, filed on Apr. 17, 2014, the disclosures of which are incorporated herein by reference.

The present invention relates to a current collector system for a vehicle which can be driven along a power rail arrangement, having at least one current collector carriage and current collector contacts arranged thereon, which are connectible with power rails of the power rail arrangement, and a telescopic arm which can be attached or is attached to the vehicle, which can be extended or retracted by means of an adjustment drive.

A system of this type is known from WO 2012/130630 A9, in which the horizontal movement of the telescopic arm and/or the vertical delivery of the current collector carriage relative to the power rail axis occurs via a lifting system with belt drive, which should be designed in an elastic and flexible manner. The threading of the current collector into the power rails also occurs here via entry funnels when driving in the longitudinal direction of the line. The telescopic arm has a base unit attached to the vehicle, on which a first telescopic stage is mounted displaceably in the horizontal direction. On the first telescopic stage a second telescopic stage is in turn mounted displaceably, wherein the first and second telescopic stages are arranged displaceably parallel to each other. On the first telescopic stage two belt wheels or toothed belt wheels are arranged for a circumferential belt or toothed belt, wherein one of the belt wheels can be driven by means of a drive. The circumferential belt is, on the one hand, firmly connected to the base unit as well as to the second telescopic stage, so that the telescopic arm will either extend or retract by adjustment of the belt. The second telescopic stage thereby moves twice as rapidly as the first telescopic stage relative to the base unit.

It is the object of the invention to provide a telescopic arm, in particular, for a current collector system, which can be extended or retracted without a circumferential belt.

The object is solved with a telescopic arm having the features of claim 1. Other advantageous embodiments of the telescopic arm according to claim 1 arise through the features of the dependent claims.

The invention is characterised in that only a single rigid chain is needed for the retraction or extension of a two-stage telescopic arm. Contrary to the belt solution known from WO 2012/130630 A9, in which a circumferential belt with two belt wheels is used, in the case of the present invention only a deflecting device, in particular in the form of a sprocket, is needed. The space for the second belt wheel is not needed and is available for other tasks and functions. Advantageously the drive for the rigid chain is arranged at the back end of the first telescopic stage, whereby a better weight distribution results and the drive is not adjusted so far outwards in the case of the extended telescopic arm itself. The rigid chain can absorb very large thrust- and tensile forces due to its structure, so that rigid chains with smaller dimensions can safely retract and extend a relatively large telescopic arm. Since a rigid chain is fixed in the direction of thrust, advantageously the telescopic arm hardly swings, as soon as the drive is stopped. Thus, a rapid and precise delivery can be advantageously achieved.

If, for example, three instead of two telescopable telescopic stages are needed, a second rigid chain drive can be arranged on the second telescopic stage, which drives a second rigid chain, which is attached with its one end to the first telescopic stage and with its other end to the third telescopic stage. The two rigid chain drives can be driven jointly or separately.

Advantageously, the stipulated telescopic arm according to the present invention for the extension and retraction of a current collector carriage can be used in the horizontal or vertical direction. The current collector carriage can be arranged on the furthest extendable telescopic stage on the front side, in particular, vertically displaceable or vertically adjustable by means of its own drive. The vertical drive can, for example, be a belt drive, chain drive, spindle drive or rigid chain drive. If no vertical drive of its own is provided for the vertical delivery of the current collector carriage, the current collector carriage, as it is known, for example, from WO 2010/054852 A2, can be lifted and positioned by means of slanted guides arranged on a line by moving the vehicle vertically to the power rails of a line. The stipulated telescopic arm can be used advantageously for cranes, in particular, container stacking cranes, also referred to as Rubber Tyred Gantries (RTGs).

Figure 2:
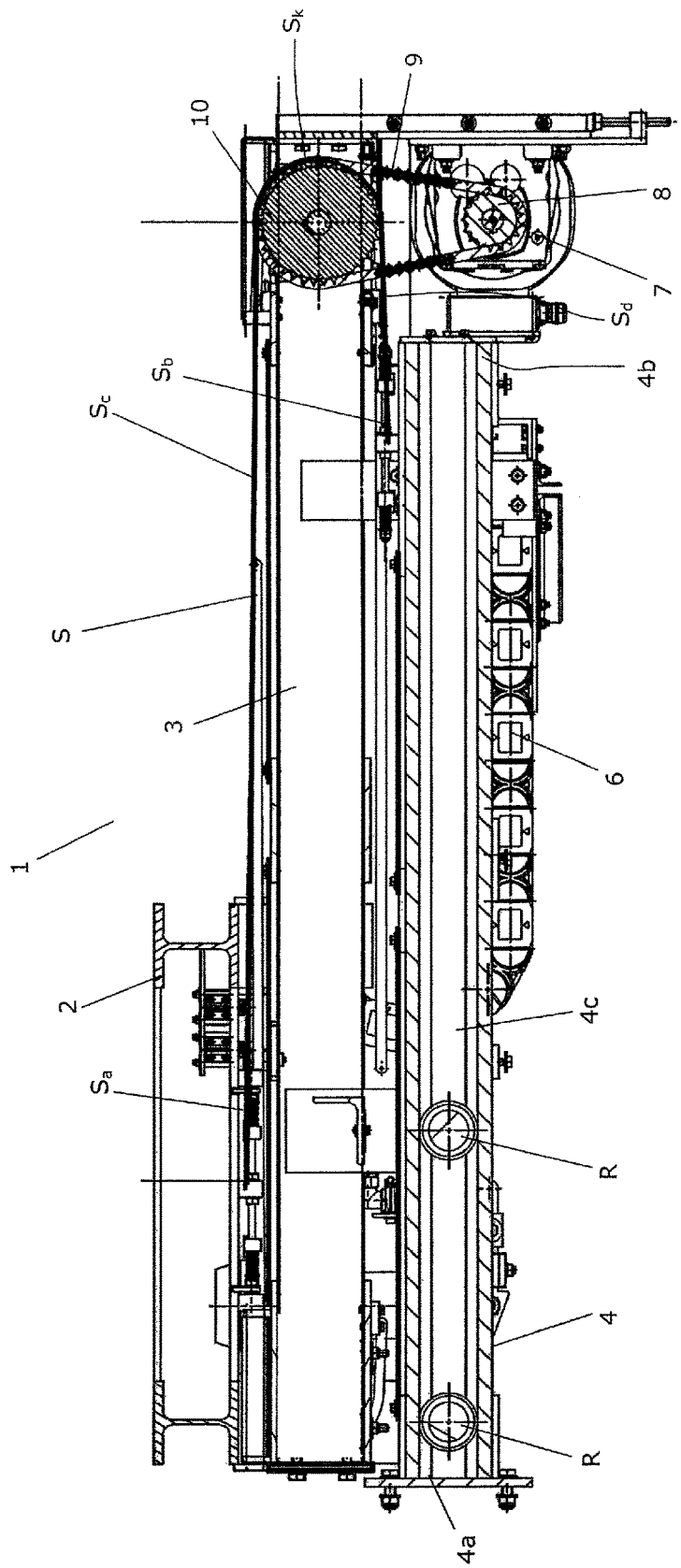
Figure 3:
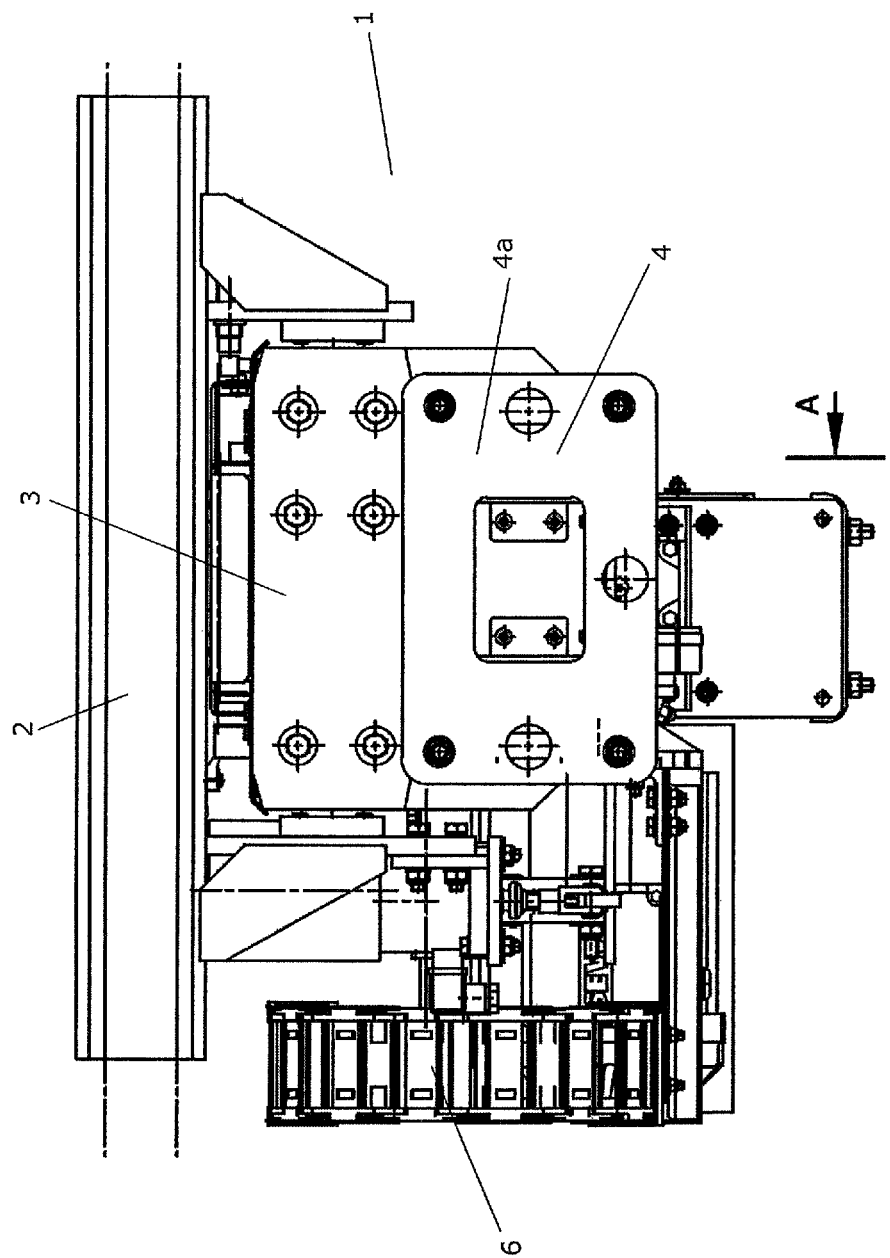
Figure 4A:
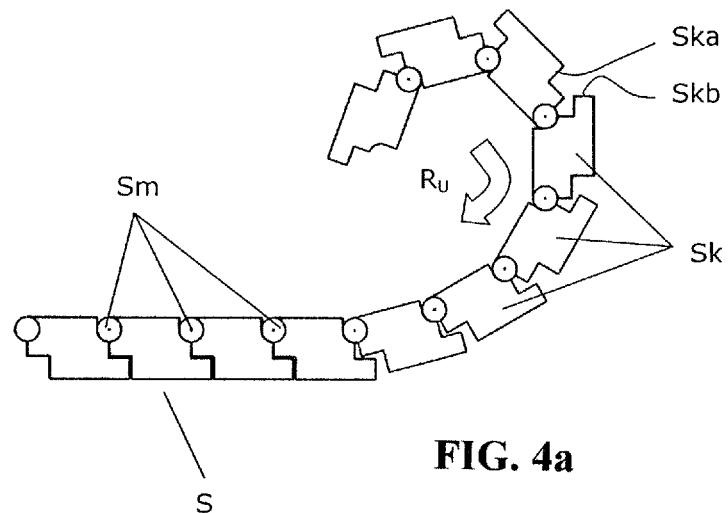
Figure 4B:
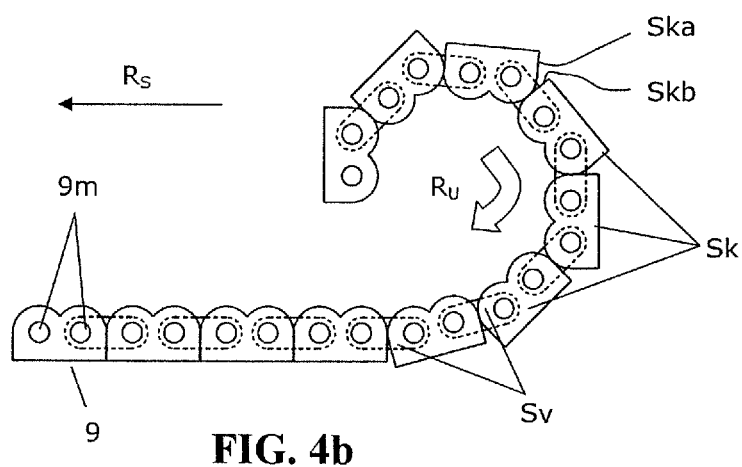
Figure 5:
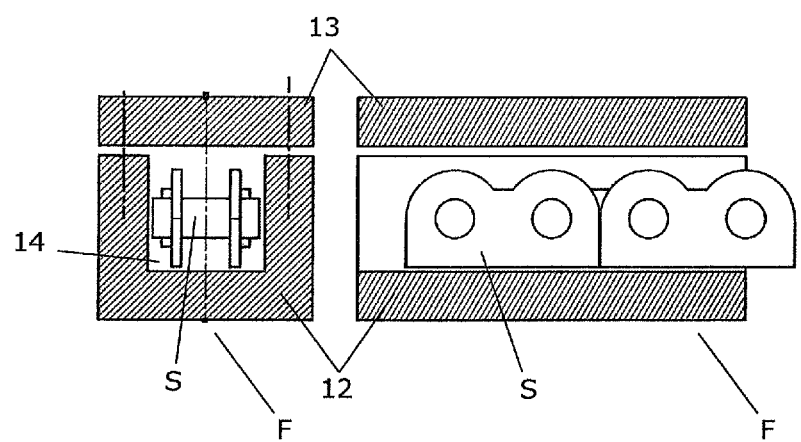

A possible embodiment of the telescopic arm according to the present invention is illustrated in detail below by means of drawings in which FIG. 1: shows a partial sectional view of an extended telescopic arm;

FIG. 2: shows a retracted telescopic arm according to FIG. 1;

FIG. 3: shows a front view of a telescopic arm according to FIG. 1;

FIGS. 4a and 4b: show two possible embodiments of rigid chains for the telescopic arm according to the present invention according to FIG. 1;

FIG. 5: shows a horizontal guide for the rigid chain.

FIG. 1 shows a possible embodiment of a telescopic arm 1 according to the present invention, which has a base unit 2, with which the telescopic arm 1 can be attached, for example, to a crane, in particular, a container stacking crane. A first telescopic stage 3 is arranged displaceably on the base unit 2 in the telescopic direction $R_T$. A second telescopic stage 4 is also arranged displaceably on the first telescopic stage 3 in the telescopic direction $R_T$. For this purpose, guide rolls R are attached to the first telescopic stage 3, which run in guides 4c of the second telescopic stage 4. A vertical guide for a current collector carriage, as it is known, for example, from WO 2010/054852 A2, can be arranged on the front side 4a of the second telescopic stage 4.

The electric motor 7 is arranged on the back side 3b of the first telescopic stage 3, which electric motor drives a rigid sprocket, which is not depicted, by means of a chain drive, around which the rigid chain S is deflected. The rigid chain S is attached with its first end $S_a$ to the base unit 2 and with its second end $S_b$ to the second telescopic stage 4, in particular, of its end area 4b. By twisting the rigid sprocket the length ratio of the upper rigid chain segment $S_c$ to the lower rigid chain segment $S_d$ changes, whereby the telescopic arm 1 will either retract or extend. At the same time, sensors can be provided, which monitor in particular the end positions as well as the extension and retraction of the telescopic arm 1. The rigid chain S can only be swiveled about the deflection direction $R_U$. If it is guided straight, the rigid chain S can transfer thrust forces, so that a retraction and extension of the telescopic arm 1 is possible.

By means of an energy chain 6 the necessary control and supply lines can be guided from the base unit 2 to the first and second telescopic stages 3.

FIG. 2 shows the telescopic arm 1 in its retracted position, in which the upper rigid chain segment $S_c$ extends nearly over the entire length of the telescopic stage 3 and the lower rigid chain segment $S_d$ is shortened to a minimal length. FIG. 3 shows a front view of the telescopic arm.

FIGS. 4a and 4b show two possible embodiments of a usable rigid chain S. The rigid chain S consists of rigid chain members Sk articulately connected to each other. Both depicted rigid chains S can only be deflected about the deflection directions $R_U$. Contrary to the deflection direction $R_U$ the rigid chains S are resistant to buckling. The buckling resistance is achieved through the contact surfaces Ska and Skb arranged transverse to the direction of thrust $R_S$. It is of course also possible to use other forms of rigid chains for the current collector system according to the present invention. It is also possible to use divided rigid chains, which consist of half rigid chains initially separated from each other. This type of rigid chain is resistant to buckling and can transfer thrust forces only through combination of the two half rigid chains.

FIG. 5 shows a possible guide F, which in each case can be arranged on the base unit 3 and/or the first and/or second telescopic stage 3, 4. The guide can be formed by a U profile 12, in the interior 14 of which the rigid chain S is guided. The U profile 12 can optionally still be sealed by means of a cover plate 13.

What is claimed is:

1. A telescopic arm for a current collector system for a vehicle which can be driven along a power rail arrangement, the telescopic arm including:
    a base unit of the telescopic arm of the current collector system configured to be attached to the vehicle,
    a first telescopic stage of the telescopic arm of the current collector system arranged displaceably in one direction,
    a second telescopic stage of the telescopic arm of the current collector system arranged displaceably on the first telescopic stage in the one direction, and
    an adjustment drive arranged on the first telescopic stage and configured to interact with a rigid chain having a first end connected to the base unit and a second end connected to the second telescopic stage,
    wherein the telescopic arm is configured to be extended and/or retracted by means of the adjustment drive.

2. The telescopic arm according to claim 1, wherein the adjustment drive has an electric motor, which drives a sprocket, which in turn drives the rigid chain.

3. The telescopic arm according to claim 2, wherein the rigid chain is deflected by 160°-180° on the first telescopic stage by the sprocket or by a deflection device.

4. The telescopic arm according to claim 1, wherein the rigid chain is guided to the first telescopic stage, the second telescopic stage, or both by means of at least one respective guide.

5. The telescopic arm according to claim 1, wherein the sprocket, the deflection device, or both is/are arranged in an area of an end of a respective telescopic stage.

6. A current collector system including the telescopic arm according to claim 1, and further including a current collector carriage with current collector contacts arranged thereon and arranged on a one of the telescopic stages that is able to be extended furthest.

7. A vehicle including the current collector system according to claim 6, wherein the vehicle is a container stacking crane.

8. A telescopic for a current collector system for a vehicle which can be driven along a power rail arrangement, the telescopic arm including:
    a base unit configured to be attached to the vehicle,
    a first telescopic stage arranged displaceably in one direction,
    a second telescopic stage arranged displaceably on the first telescopic stage in the one direction, and
    an adjustment drive arranged on the first telescopic stage and configured to interact with a rigid chain having a first, end connected to the base unit and a second end connected to the second telescopic stage,
    wherein the telescopic arm is configured to be extended and/or retracted by means of the adjustment drive, the telescopic arm further including:
    a third telescopic stage mounted displaceably on the second telescopic stage, and
    a deflection device arranged on the second telescopic stage for a second rigid chain, wherein the second rigid chain is attached by a first end to the first telescopic stage and by a second end to the third telescopic stage.

9. A telescopic for a current collector system for a vehicle which can be driven along a power rail arrangement, the telescopic arm including:
    a base unit configured to be attached to the vehicle,
    a first telescopic stage arranged displaceably in one direction,
    a second telescopic stage arranged displaceably on the first telescopic stage in the one direction, and
    an adjustment drive arranged on the first telescopic stage and configured to interact with a rigid chain having a first, end connected to the base unit and a second end connected to the second telescopic stage,
    wherein the telescopic arm is configured to be extended and/or retracted by means of the adjustment drive, wherein the adjustment drive has an electric motor, which drives a sprocket, which in turn drives the rigid chain, wherein the rigid chain is deflected by 160°-180° on the first telescopic stage by the sprocket or by a deflection device, and wherein the rigid chain comprises two rigid chain sections, which are located between a respective mounting point on the telescopic stage or the base unit and the deflection device or the sprocket, and extend nearly parallel or parallel to the one direction along the first telescopic stage in a straight form and thus can absorb thrust and tensile forces, wherein the rigid chain is guided in a curved path only in and area of the sprocket and/or of the deflection device.

* * * * *